I. A. MURCHISON.
Hoe and Rake.
No. 225,157. Patented Mar. 2, 1880.
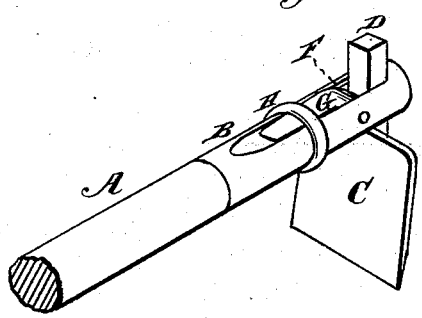
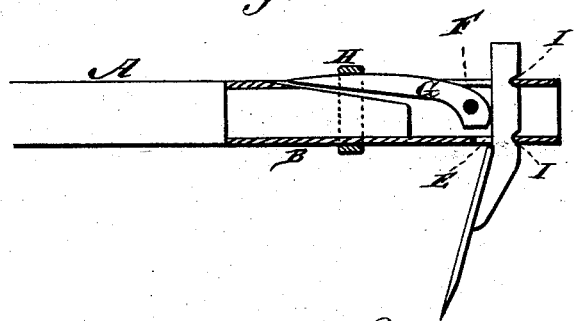
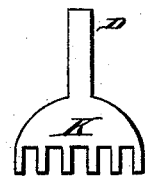
WITNESSES
Robert Everett
Chas. Y. Page
INVENTOR
Isaac A. Murchison
Gilmore Smith & Co,
ATTORNEYS

UNITED STATES PATENT OFFICE.

ISAAC A. MURCHISON, OF MANCHESTER, NORTH CAROLINA.

HOE AND RAKE.

SPECIFICATION forming part of Letters Patent No. 225,157, dated March 2, 1880.

Application filed January 10, 1880.

*To all whom it may concern:*

Be it known that I, ISAAC A. MURCHISON, of Manchester, in the county of Cumberland and State of North Carolina, have invented certain new and useful Improvements in Attachment-Handles for Hoes, Rakes, Forks, &c.; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my attachment-handles for hoes, rakes, forks, &c. Fig. 2 is a longitudinal sectional view of the same, and Fig. 3 is a detail view.

The nature of my invention relates to an improved mode of attaching handles to hoes, rakes, forks, and the like; and it consists, essentially, in securing the shank of the hoe or other implement within a slotted sleeve upon the handle by means of a pivoted cam-lever, which is held against such shank by means of a sliding ring or collar, as hereinafter fully described, and particularly pointed out in the claims.

In the drawings, A designates the handle, and B the slotted sleeve or ferrule which is secured upon one end thereof. The hoe-blade C, herein illustrated, has its shank D passed through an opening, E, which is about equal in area to the diameter of the shank, and also passed up through an oblong slot, F, which extends along the sleeve for a considerable portion of its length, and upon an opposite side to that in which the opening E is made.

A cam-lever, G, is pivoted in the sleeve B in such position that when its longer arm is raised up through the slot F its shorter cam end will not act against the shank of the hoe-blade, but when the said long arm is depressed so that the lever will be passed down through the slot into the sleeve, the cam end of the lever will be forced against the shank, which will be held between the same and the walls of one end of the slot, and also the side of the opening F nearest to the outer end of the sleeve. To maintain the cam-lever in this position I provide a ring or collar, H, which will be slipped over the lever, as herein shown.

The shank is provided with notches I, which, by catching upon the sleeve, serve as a means auxiliary to the cam-lever for maintaining the shank of the tool or implement in place.

K designates a rake the shank of which is notched in a manner similar to the shank of the above-described hoe-blade.

Having thus described my invention, what I claim is—

1. In a handle for hoes, rakes, and the like, the handle A, provided with the sleeve B, slotted at F and recessed at E, in combination with the cam-lever G and sliding collar H, substantially as and for the purposes set forth.

2. The hoe or rake having the notched shank I, in combination with the slotted and recessed sleeve B, cam-lever G, and sliding collar H, substantially as and for the purposes set forth.

In testimony that I claim the above I have hereunto subscribed my name in the presence of two witnesses.

ISAAC ALEX. MURCHISON.

Witnesses:
J. A. McPHERSON,
JOHN F. CLARK.